Nov. 18, 1969

R. E. PECHACEK 3,478,920

PRESSURE VESSEL CLOSURE

Filed Oct. 14, 1968

Raymond E. Pechacek
INVENTOR

BY
Hayden Pravel Wilson & Matthews
ATTORNEYS

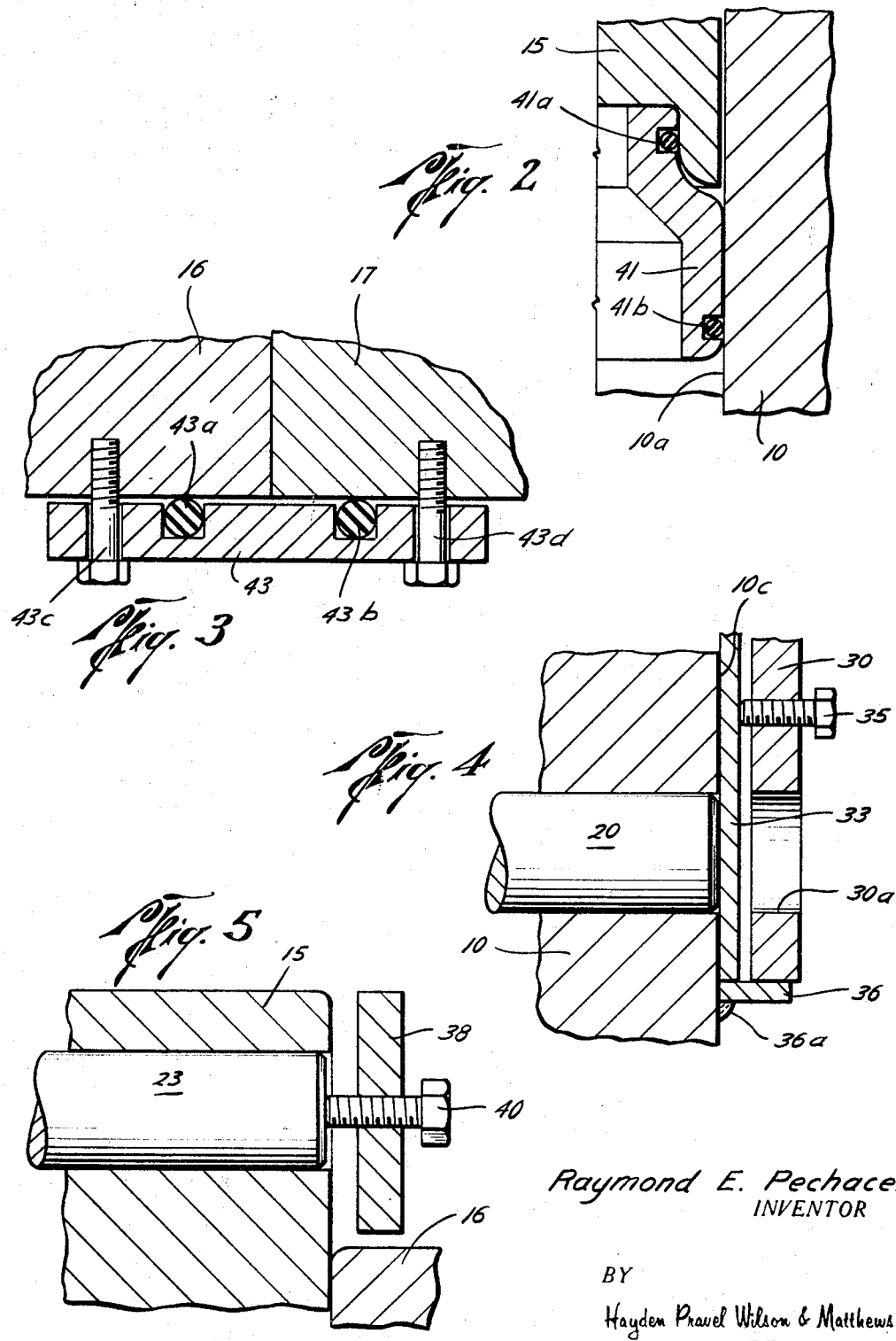

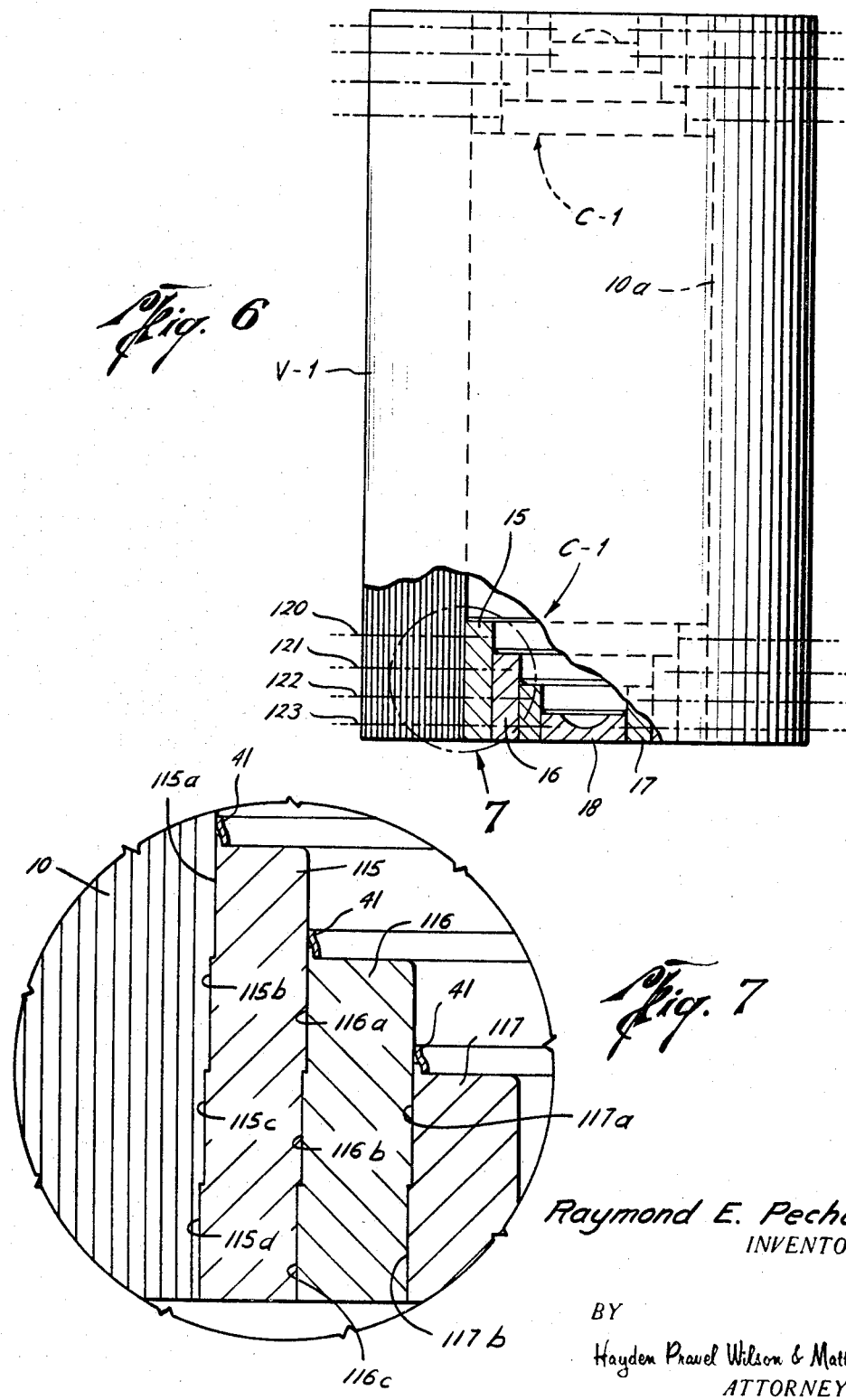

United States Patent Office 3,478,920
Patented Nov. 18, 1969

3,478,920
PRESSURE VESSEL CLOSURE
Raymond E. Pechacek, Houston, Tex., assignor to
Hahn & Clay, a corporation of Texas
Filed Oct. 14, 1968, Ser. No. 767,119
Int. Cl. B65d 45/28
U.S. Cl. 220—55                                12 Claims

ABSTRACT OF THE DISCLOSURE

A pressure vessel closure formed of a plurality of concentric rings or sections adapted to extend into the bore of a pressure vessel and close same; such ring being heat treated for substantially uniform strength throughout each ring; and said rings being releasably secured to the wall of the pressure vessel by circumferentially disposed radially extending retaining pins, whereby shear forces acting on the rings are transmitted to all or a substantial part of the layers or other material forming the wall of the vessel.

Background of the invention

The field of this invention is closures for pressure vessels.

Pressure vessels which are used for test chamber and similar applications are often relatively large and are subjected to high pressures (e.g. 20,000 p.s.i. and higher) under cyclic or fatigue conditions. Such vessels may have an inside diameter of ten feet or more and a wall thickness of four feet or more. When such pressure vessels must be frequently opened to insert and/or remove objects to be tested under high pressure, the construction of the closure so that it may be removed presents many problems. Conventionally, the closure has been formed of a solid circular plug in each open end or bore of the pressure vessel and with an extremely large and heavy external frame surrounding the vessel and backing up the circular plug or plugs to resist the pressures to which they are subjected. Furthermore, when steel forming such plugs or frame or other closure reaches a thickness above about five inches, heat treating by known methods does not produce uniform properties such as strength throughout the material. When the thicknesses exceed twelve inches, the strength and other properties of the steel vary drastically throughout material. It would be safe to say that for thickness of steel above eight inches heat treating, using known quenching and tempering techniques, would not result in sufficiently uniform strength for the use of such material under high pressure service with cyclic or fatigue loading.

Additionally, prior closures have been extremely large, heavy, expensive and difficult to open and close.

Summary of the invention

With the present invention, a closure for pressure vessels is provided which is preferably removable and is made from a plurality of sections or concentric rings, each of which is unifromly heat treated, and which are releasably retained in the bore of the pressure vessel with retaining pins, preferably also heat treated. Under load from the pressure within the vessel, the closure as well as the rest of the vessel, are free to move due to the flexibility of the structure, while at the same time holding extremely high pressures of the magnitude of twenty thousand pounds per square inch and more.

Brief description of the drawing

FIG. 2 is a sectional view illustrating in detail the portion circled and designated with the reference numeral "2" in FIG. 1;

FIG. 3 is a sectional view illustrating in detail the portion circled and having the numeral "3" designating same in FIG. 1;

FIG. 4 is a sectional view, partly in elevation, illustrating in detail the portion circled in FIG. 1 and having the numeral "4" designating same;

FIG. 5 is a detailed sectional view, partly in elevation, illustrating the portion circled in FIG. 1 and having the numeral "5" designating same;

FIG. 6 is a schematic view illustrating a modified form of the invention; and

FIG. 7 is an enlarged sectional view illustrating in detail the portion circled in FIG. 6 and having the numeral "7" designating same.

Description of the preferred embodiments

Figure 1:
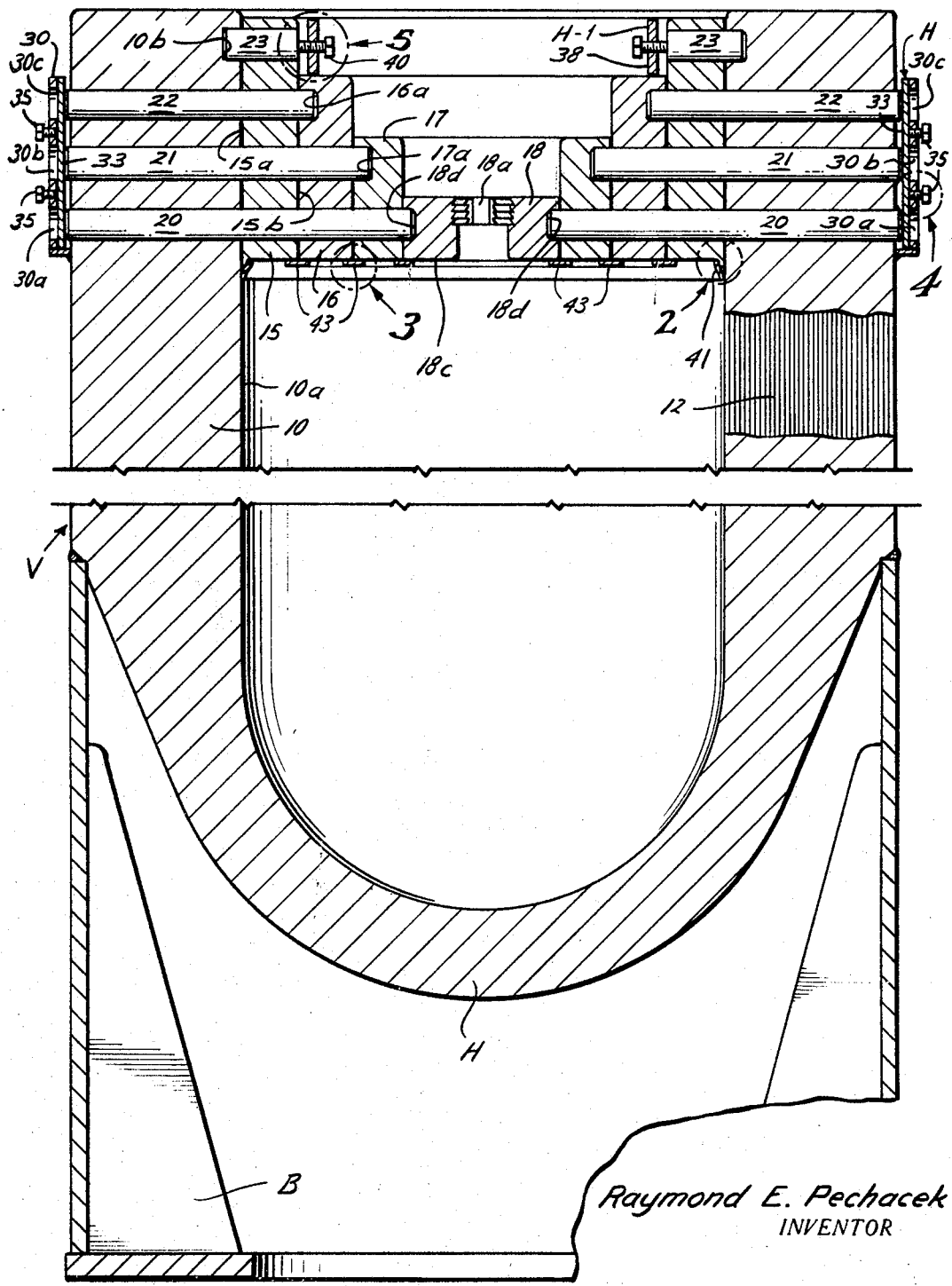
FIG. 1 is a sectional view, partly in elevation, illustrating one form of the present invention.

In the drawings, the letter V designates generally a pressure vessel which is preferably of the multi-layer or laminated construction. The vessel V may be used as a test vessel wherein relatively high pressures are developed internally of the vessel V for testing an object or objects disposed therein, as is well understood. As illustrated, the vessel V is formed with a head H on its lower end and with a closure C at its upper end. The vessel V is illustrated as mounted on a base B for supporting the vessel V in a substantially vertical position, although the vessel V may be used in any other position. Also, the closure C may be used at both ends of the vessel V in some instances, as will be more evident hereinafter. When the head H is used at one end of the vessel V, it is also of either multi-layer construction or solid wall construction and is secured to the wall 10 of the vessel V by welding in the conventional manner. A plurality of layers 12 are illustrated in a portion of FIG. 1 of the drawings to illustrate the preferred multi-layer construction of the wall 10 of the pressure vessel V.

In the form of the invention illustrated in FIG. 1, the closure C is disposed at the upper end of the bore 10a of the wall 10 of the vessel V. Such closure C is formed by a plurality of closure sections, which as illustrated in FIG. 1, includes concentric rings 15, 16, 17 and a central plug or plate 18. The plug or plate 18 may be solid throughout, or it may be a ring with a removable threaded central section 18a. In such case, the threaded section 18a actually constitutes the central plug or plate.

The rings 15, 16, 17 and plate 18 are all made of steel or other metal which has a thickness less than about 8 inches in at least one direction so that using conventional heat treating procedures, uniform heat treatment and high strength throughout the metal results. Thus, the thickness of the outer ring 15 from its outer surface or diameter 15a to its inner surface or diameter 15b is less than about eight inches and certainly would be less than twelve inches using presently known heat treating techniques. Likewise the radial thicknesses of the other rings 16 and 17 are less than eight to ten inches and certainly less than twelve inches using conventional heat treating techniques to assure that the heat treating is uniform throughout the thicknesses thereof. The ring or plate 18 has its least dimension running from its outer lateral surface 18b to its inner lateral surface 18c, and it is that dimension which is normally less than about eight inches and certainly less than twelve inches, using conventional heat treating techniques.

It is noted from FIG. 1 that the rings 15, 16, 17 and 18 are progressively smaller in diameter from the bore 10a inwardly. The rings 15–17 and plate 18 are also progressively smaller in lateral thickness or length since they are subjected to lower shearing forces as they approach the center of the bore 10a of the vessel V. In this way, a greater number of retaining pins are used for the closure sections as they progress radially outwardly, as will be more evident hereinafter.

Retaining pins 20, 21, 22 and 23 are preferably arranged in circumferentially disposed rows, and with such pins extending radially through the wall 10 of the vessel V and into some or all of the closure sections such as the rings 15, 16, 17 and the plate 18. It will be understood that the number of such pins 20–23 which are utilized, depends upon the size of the pins, and the forces to which they are subjected. In the preferred form of the invention, there are twelve retaining pins 20 disposed in the same circular plane, extending radially through suitable openings in the rings 15, 16 and 17, and into suitable recesses 18d in the ring or plug 18. The retaining pins 21 all lie in the same circular plane and extend radially through the rings 15 and 16 and into suitable recesses or holes 17a in the ring 17.

Similarly, the retaining pins 22 lie in the same circular plane and extend radially through the ring 15 and into recesses 16a in the ring 16. The pins 23 lie in the same circular plane and extend radially through the ring 15 and into a recess or holes 10b in the wall 10. In the preferred form of the invention, there would be twelve of the retaining pins 21 in the same circular plane, and there would be twenty-four retaining pins 22 in the same circular plane. Also, there would be fifty retaining pins 23 in the same circular plane. Such pins 20–23 may either be straight pins of the same diameter throughout each length, or they may be tapered from the outside inwardly to facilitate insertion and removal of the pins. The retaining pins 20–23 are held or confined by suitable holding means, one type of which is indicated at H (FIG. 1) for pins 20, 21 and 22, and another type of which is indicated at H–1 in FIG. 1 for the pins 23. The holding or confining means H includes an annular or cylindrical band 30 which has an opening 30a for alignment with each of the pins 20, and opening 30b for alignment with each of the pins 21, and an opening 30c for alignment with each of the pins 22. The band 30 is radially spaced from the external surface of the wall 10 of the pressure vessel V a sufficient distance to receive a plurality of strips 33 which cover each row of vertically aligned pins 20, 21 and 22, or the strips 33 may be formed as a single cylindrical or split band which extends around the external surface of the wall 10 and is confined inwardly of the band 30. Clamping screws 35 are threaded through the band 30 and engage the strips or band 33 for locking same against the outer ends of the pins 20, 21 and 22 to thereby hold such pins in their assembled position. A stop lug or lugs 36 are preferably welded at 36a (FIG. 4) to the wall 10 of the vessel V for supporting the ring 30 to readily align the holes 30a, 30b and 30c with the openings for the pins 20, 21 and 22, respectively. Thus, by tightening the bolts or threaded members 35 inwardly with respect to the plate 30, the strips or plates 33 are firmly locked to the wall 10 and they contact the external surface 10c of such wall 10 and/or the outer ends of the pins 20, 21 and 22.

A similar holding or confining means H–1 for the pins 23 is disposed inwardly of the pins 23 since they do not extend completely through the wall 10. Thus, as seen in FIGS. 1 and 5, the holding means H–1 includes an annular band 38 of steel or other material which has a plurality of bolts 40 threaded therethrough for engagement with each of the pins 23. Thus, by threading the bolts 40 or other threaded means inwardly into contact with the exposed ends of the pins 23, such pins 23 are held or are confined in their retaining position with their inner ends within the holes or recess 10b and extending through the ring 15. It will be appreciated that the pins 23 could be made similar to the pins 22, but shorter so that they would extend entirely through the wall 10 and enter a recess or holes (not shown) in the ring 15. In such case, the holding means H would be extended so as to confine the outer ends of such pins 23 in the same manner as described and illustrated with respect to the pins 20, 21, and 22. Also, the pins 21 and 22 could be inserted from the inside of the rings 15 and 16 similarly to the pins 23, in which case each of the sets of pins 21 and 22 would have a holding means corresponding to the holding means H–1.

The adjacent surfaces of the rings 15, 16, 17 and the plate 18 are machined or otherwise formed with extremely close tolerances and a smooth fit so that they are substantially sealed off between such closure sections. However, additional sealing means are preferably provided between the adjacent surfaces of the closure sections and the wall of the bore 10a to assure the sealing off of the pressure within the pressure vessel V. For providing a seal between the outermost closure ring 15 and the wall of the bore 10a, a seal assembly 41 having O-rings 41a and 41b, and which is of the type disclosed in U.S. Patent No. 3,339,787 dated Sept. 5, 1967, is preferably used. As explained in said patent, the seal ring 41 flexes in response to the expansion and contraction of the parts being sealed so as to maintain a constant seal under variable pressure conditions within the pressure vessel V.

One type of seal for sealing the annular space between rings 16 and 17 is shown in an enlarged portion in FIG. 3. Such seal includes a circular ring 43 formed of steel or other material and which has suitable annular grooves for a pair of O-rings 43a and 43b formed of rubber or similar material. The rings 43a and 43b are disposed on each side of the adjacent contacting surfaces between the rings 16 and 17 as best seen in FIG. 3. Such rings 43a and 43b are held in tight sealing contact with the ends of the rings 16 and 17 by a set of circularly disposed bolts or screws 43c and a set of circularly disposed bolts or screws 43d which are threaded into suitable openings in the ends of the rings 16 and 17. To provide for additional flexibility while maintaining the seals with the rings 43a and 43b, only the bolts 43c are employed, in which case, there would be no bolted connection to the ring 17. Thus, if there is any movement of the closures 16 and 17 relative to each other, the seal is still provided by the rings 43a and 43b.

A duplicate sealing arrangement to that shown in FIG. 3 is preferably provided between the rings 15 and 16, as well as between the rings 17 and the central plug or plate 18, as indicated in FIG. 1.

In the operation or use of the form of the invention illustrated in FIGS. 1–5, the closure C is initially assembled as illustrated in FIG. 1, with the retaining pins 20–23 securely holding the end closures 15, 16, 17 and 18 and positioned with the bore 10a of the pressure vessel V. When dealing with extremely high pressure and high shear loads on the pins 20–23, it is preferable to heat treat such retaining pins 20–23. Typical installation such as where the vessel V is used as a test vessel, may have pressures as high as 20,000 pounds per square inch or higher developed internally of the vessel V. It will be appreciated that suitable inlet openings and controls for obtaining such internal pressure are provided and are not illustrated since they form no part of the present invention. The closure C of the present invention provides the same strength as prior closure constructions with approximately half as much weight; also, only about half as much space is required for maintaining the closure as compared to prior art closures. In addition, the closure of the present invention is less expensive than are closures for this type of vessel operating under high pressure. The central threaded plug 18a may be relatively small, normally one or two feet in diameter as compared to the internal diameter of the bore 10a which may be as high as ten to twelve feet. If the object being tested in the vessel V is sufficiently small to pass through the opening provided when the plug 18 is removed, the object may be inserted by simply removing the plug 18a and then replacing same after the object has been disposed within the vessel V. If the diameter of the object to be tested is larger than the plug 18a, then the ring or plate 18 may be removed by pulling the pins 20 radially outwardly. Of course, prior to removal of any of the pins 20, 21, 22 and 23, the holding means H and/or H–1 must be moved out of the way. However, it will be understood that the holding means H and H–1 is not essential, where the retaining pins are horizontally disposed as illustrated in FIG. 1, but some such holding means would be required if the pins are disposed so that they might fall by gravity if not held or confined. In any event, as many of the rings or closure sections may be removed as is necessary or desirable to provide a large enough opening to remove and/or insert an object to be tested within the vessel V. Thereafter the rings are reassembled with the retaining pins 20–23 in the positions indicated.

The complete closure C has all of the laterally extending inner surfaces of the rings 15–17 and the plate 18 in alignment to form a flat or continuous inner surface which may be lined with suitable lining material if so desired. If the pins 20–23 are welded or otherwise permanently attached to the wall 10 and/or the closure sections 15–18, then the pins and the closure C are not removable under normal operations. Under such conditions, the closure C has the same advantages as described above, except for the removability feature.

If seals of the type illustrated in FIG. 3 are employed, all of the closure sections 15–18 are removed as a unit since they are screwed or bolted together by the sets of screws or bolts 43c and 43d. But, if the seals are modified so that only one set of the bolts 43c is utilized for each ring 43, and the bolts 43c are not used, then the sections 15–18 are separably removable.

In FIG. 6, a modified end closure C–1 is schematically illustrated at each end of a pressure vessel cylinder V–1. The vessel cylinder V–1 is preferably of multi-layer structure, as previously explained in connection with the vessel V. It will also be appreciated that the closure C may be used at both ends of the vessel V rather than using the head H, in which case the vessel V would also be a cylinder having the closure C at each end in the same manner as illustrated in FIG. 6.

The closure C–1 are essentially the same as illustrated in FIG. 1, except that the central part 18 is disposed at the outermost longitudinal point in the end of the bore 10a of the vessel V–1 so that the outer surface thereof is in alignment with the outer surfaces of the concentric closure rings 15–17. In such case, the retaining pins indicated schematically at 120, 121, 122 and 123 are extending through the wall to the vessel V–1 and into the successively disposed rings 15–17 and the plate 18 is essentially the same manner as illustrated in FIG. 1 of the drawing. Again, the central plate or plug 18 may be a solid plug as illustrated in FIG. 6, or it may have a separate releasable plug or closure therewith such as indicated at 18a in FIG. 1. It should be noted that in both FIGS. 1 and 6 the use of the retaining pins 20–23 and 120–123 provides for a distribution of the shear forces to all of the layers in a multi-layer construction rather than just to the innermost or skin on the inside of the bore 10a of the vessel wall V–1. Thus, the typical special forging presently used at the ends of laminated or multi-layer vessels is eliminated when using the end closure or closures of the present invention.

In FIG. 7, an enlarged fragmentary view of rings 115, 116 and 117 is shown wherein they have stepped external and internal diameter portions mating with each other. Thus, the concentric rings 115 have notched or stepped diameters 115a, 115b, 115c and 115d which are progressively larger from the inside towards the outside of the vessel. The wall 10 of the vessel V–1 is correspondingly stepped to receive such stepped diameter portions. The ring 116 has stepped diameter portions 116a, 116b, and 116c which are made with corresponding internal stepped surfaces on the ring 115. The ring 117 has stepped diameter portions 117a and 117b which mate with corresponding stepped internal portions on the ring 116. It will be understood that more or less of such stepped portions on each of the rings may be employed, the purpose being to facilitate the removal of the rings from the vessel. Since the surfaces adjacent to each other with respect to such rings and the inside bore 10a are close fitting, they require rather extensive contact throughout the sliding of each of the rings to and from the closure position. With the stepped notches, there is contact between the adjacent surfaces of the rings and the bore 10a only so long as the innermost stepped portion is in engagement. Thereafter, the innermost stepped portion lines up with the larger diameters and there is substantially no frictional engagement or contact therebetween, as the rings are withdrawn from the vessel. Although FIG. 7 is illustrated as having the modified rings 115, 116 and 117, FIG. 6 is shown with the type of rings 15, 16 and 17 illustrated in FIG. 1 but it will be understood that both types of rings are interchangable and may be used in either form of the invention shown in FIG. 1 or FIG. 6.

It should also be noted that when the rings are staggered as in either FIG. 6 or FIG. 7, the seals between the rings, whether of the stepped type or the uniform diameter type, are preferably provided by the flexible metallic rings 41, and O-rings therewith, the details of which are shown in FIG. 2 and also in U.S. Patent No. 3,339,787 as previously explained.

I claim:
1. A closure for a pressure vessel having a wall defining a bore which is open at at least one end comprising:
   (a) a plurality of closure sections adapted to be disposed in the bore of a vessel for closing same;
   (b) each of said closure sections being of substantially uniform strength throughout its entire thickness; and
   (c) retaining pins extending into the wall of the pressure vessel and into said closure sections for retaining said sections when high internal pressure is developed in the pressure vessel.
2. The structure set forth in claim 1, wherein:
   (a) said closure sections include a plurality of concentric rings; and
   (b) each of said rings is separate from the other rings for separate removal from the vessel.
3. The structure set forth in clam 2, wherein:
   (a) each of said rings and the bore of said vessel has stepped diameters; and
   (b) the largest of the stepped diameters for each ring being nearest the end of the vessel and progressively being reduced inwardly of such end to thereby facilitate removal of the rings from the vessel.
4. The structure set forth in claim 1, including:
   (a) means for sealing between the adjacent closure sections; and
   (b) means for sealing between the outermost closure section and the wall of the pressure vessel.
5. The structure set forth in claim 1, wherein:
   (a) said retaining pins are releasable from the vessel and the closure sections for thereby releasing the sections from the vessel.
6. The structure set forth in claim 1, wherein:
   (a) said closure sections includes a plurality of concentric rings and a central plug; and
   (b) each of said rings and said plug are separable from each other and from the vessel for separate removal from the vessel.
7. The structure set forth in claim 1, wherein:
   (a) said closure sections includes a plurality of concentric rings and a central plug;
   (b) said rings having progressively decreasing di- ameters from the inside diameter of the bore of said vessel to the outside diameter of said plug;

(c) the rings also having progressively smaller longitudinal thicknesses from the inside surface of said vessel inwardly; and (d) the outer rings having a plurality of rows of said retaining pins therethrough for retaining same in said vessel.

8. The structure set forth in claim 1, wherein:

(a) said retaining pins are circumferentially disposed and are releasable from the vessel and closure sections for thereby releasing the sections from the vessel; and (b) pin holding means for releasably holding said retaining pins to prevent inadvertent release thereof.

9. A closure for a pressure vessel having a wall defining a bore which is open at at least one end comprising:

(a) a plurality of concentric rings and a central plug adapted to be disposed in the bore of a vessel for closing same;

(b) each of said rings and said plug being of substantially uniform strength throughout its entire thickness; and (c) a plurality of circumferentially disposed sets of retaining pins extending into the wall of the pressure vessel, with at least one set extending into all of said rings and the other sets extending into some of said rings for retaining said rings and said plug in said vessel wall when high internal pressure is developed in the pressure vessel.

10. The structure set forth in claim 9, wherein:

(a) said retaining pins are releasable from the vessel and rings for thereby releasing said closure from the vessel.

11. The structure set forth in claim 9, wherein:

(a) all of said rings having their inner lateral surfaces in alignment so as to form a substantially flat inner end wall.

12. The structure set forth in claim 9, wherein:

(a) said retaining pins are releasable from the vessel and rings for thereby releasing said closure from the vessel; and (b) pin holding means for releasably holding said retaining pins to prevent inadvertent release thereof.

References Cited

UNITED STATES PATENTS

| 2,797,948 | 7/1957 | Tangard | 220—55 XR |
| 3,074,591 | 1/1963 | Raver | 220—46 |
| 3,393,820 | 7/1968 | Fuchs | 220—3 |

GEORGE T. HALL, Primary Examiner

U.S. Cl. X.R.

18—16; 220—3, 46